July 15, 1958 L. M. ILGENFRITZ 2,843,668

REPEATER TESTING SYSTEM

Filed Aug. 27, 1956 2 Sheets-Sheet 1

INVENTOR
L. M. ILGENFRITZ
BY Patrick J. Roche
ATTORNEY

July 15, 1958 L. M. ILGENFRITZ 2,843,668

REPEATER TESTING SYSTEM

Filed Aug. 27, 1956 2 Sheets-Sheet 2

INVENTOR
L. M. ILGENFRITZ
BY Patrick J. Roche
ATTORNEY

United States Patent Office 2,843,668
Patented July 15, 1958

2,843,668

REPEATER TESTING SYSTEM

Lester M. Ilgenfritz, Mamaroneck, N. Y., assignor to Bell Telephone Laboratories, Incorporated, New York, N. Y., a corporation of New York Application August 27, 1956, Serial No. 606,485

8 Claims. (Cl. 178—69)

This invention relates to apparatus for the remote testing of repeaters, or amplifying elements, associated with long distance signal transmission systems, such as submarine cables.

An object of the invention is to facilitate the remote supervision of a signal transmission system which includes unattended repeater stations.

Another object is to simplify the determination of a particular unattended repeater station at which a fault may have occurred, from an intermediate attended repeater station or a terminal station.

A still further object is to identify rapidly and accurately repeaters which are faulty or degraded in performance from a terminal or other control station.

In the servicing of repeatered submarine or buried signal transmission systems, difficulty arises in detecting and identifying faulty repeaters which are inaccessible to ordinary test methods. Moreover, in order that the repeaters may be repaired or replaced as soon as their performance becomes degraded, and before a complete breakdown occurs in the transmission system, it is desirable to provide for a routine testing of the respective repeaters at regular intervals.

It is usual in long-distance signal transmission systems to employ the carrier principle whereby numerous communication channels are provided over a single transmission facility. Two-way transmission may be effected for a large number of channels by employing separate circuits for each direction of signal transmission in a so-called four-wire system. Also it is known to provide two-way signal transmission over a single circuit by having the channels for one direction of transmission occupy a first band of signal frequencies sufficiently displaced from a second band of signal frequencies used for the other direction of transmission to avoid cross-talk problems. This is often called equivalent four-wire transmission.

In accordance with the present invention, equivalent four-wire transmission is used to provide a simple and expedient system for remote repeater testing. At each unattended two-way repeater station of a long-distance transmission system a special circuit bridged across the output side of the repeater for one direction of transmission is capable of selecting and mixing waves of two discrete frequencies lying in or adjacent to the high transmission band of frequencies to produce a wave of a unique difference frequency lying in or adjacent to the low transmission band. This special circuit is responsive to a set of test frequencies unique to each repeater station and preassigned thereto for identification purposes. In checking the performance of each individual unattended repeater station, it is only necessary to inject at an attended station the two test signals of the proper predetermined discrete frequencies in the high band and, if the repeater is functioning correctly, the return signal of the proper assigned difference freqeuncy will be received. The return signal may be detected and measured by conventional means to determine on an amplitude basis, for example, whether the particular repeater station is functioning at all or is degraded in performance.

A feature of the invention is that a minimum of auxiliary equipment is required at each unattended repeater station. The special circuit is entirely composed of passive elements and therefore draws no signal power from the transmission line.

A further feature is that the special circuit, though responding to a different pair of frequencies at each unattended station, nevertheless may be of common design and is thus economical to produce and maintain.

A still further feature is that a minimum amount of test equipment of common design is required at the attended testing station. One of the injected test frequencies may be made common to all unattended repeaters, for example, and be derived from the carrier supply generators. The second of the injected test frequencies may be derived from a standard test oscillator which is also useful for other types of system testing.

A more complete understanding of the invention will be obtained from the detailed description which follows when read with reference to the appended drawings, in which:

Fig. 1 illustrates a typical two-way equivalent four-wire repeatered submarine cable transmission system to which the principles of this invention may be advantageously applied.

Figure 1:
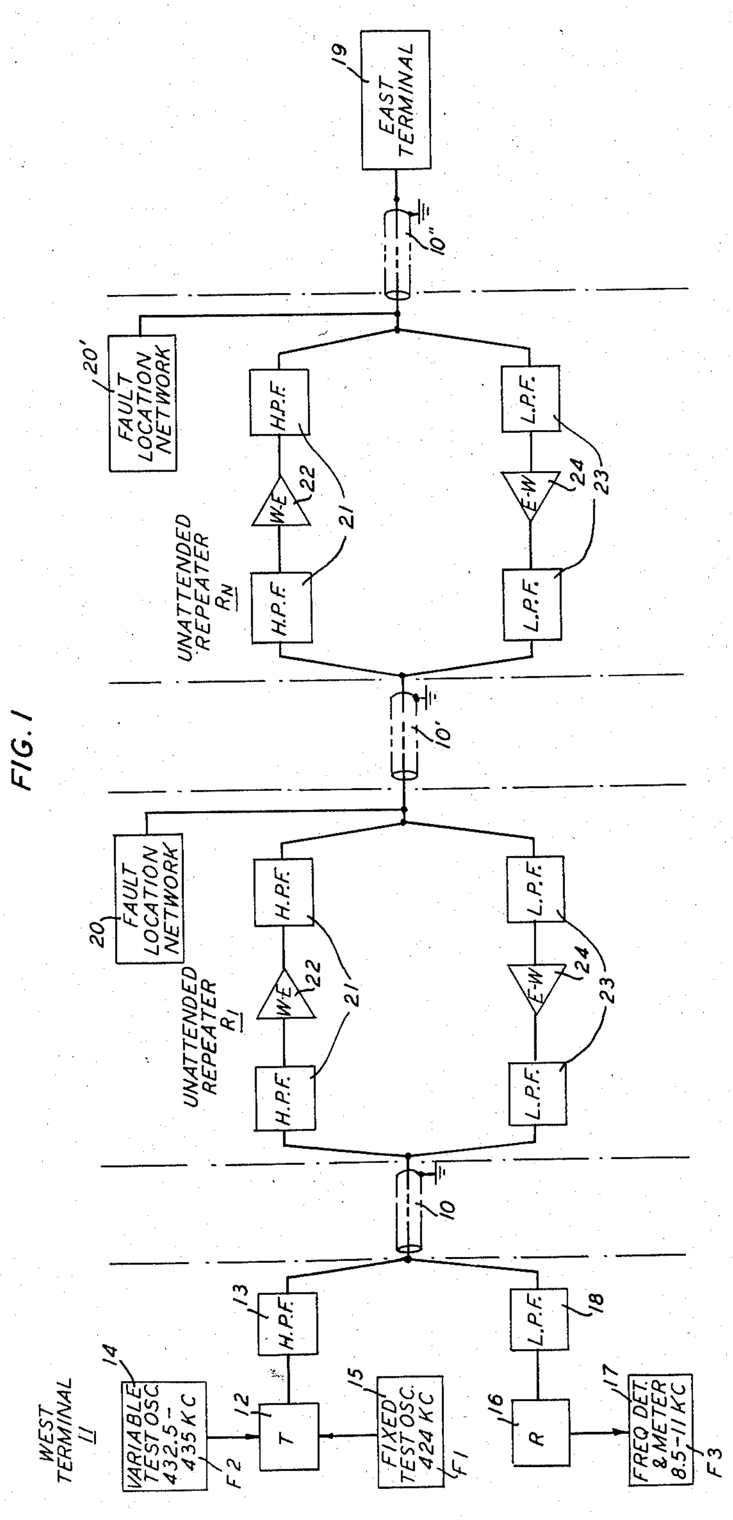
Fig. 1 shows in block diagrammatic form a two-way signal transmission system embodying the invention.

The signal transmission system itself is well known in the art and comprises west and east terminal stations 11 and 19, respectively, joined by a plurality of similar cable sections such as 10, 10′ and 10″, and a plurality of two-way repeater stations R1 to RN connecting successive cable lengths adapted to compensate for the transmission losses of the respective cable sections. At the west terminal, transmitter 12 comprising the usual signal and carrier sources and modulator provides signal modulated carrier waves of which a preselected band say, for example, 240 kilocycles per second to 432 kilocycles per second is selected by HPF filter 13 and then applied to the central conductor of cable section 10. Filter 13 serves also to block from transmitter 12 signals in the low band received on cable section 10. The receiver 16 of the west terminal comprises the usual carrier source, modulator and detector, not shown, and is coupled to the central conductor of cable section 10 by low-pass filter 18 which prevents the high-band transmitted signals from being fed directly into the receiver. The low band of received carrier signals may extend, for example, from 12 kilocycles per second to 204 kilocycles per second. It is thus seen that this system can accommodate up to 48 channels of four-kilocycle bandwidth for each direction of signal transmission.

Repeater stations R1 through RN are designed for separate amplification of the high and low bands of carrier signal frequencies by the provision of one-way amplifiers 22 and 24 separated by high-pass directional filters 21 from successive cable sections for west-to-east high-band transmission and by low-pass directional filters 23 for east-to-west low-band transmission. East terminal 19 is similar to the west terminal but is not shown in detail because a complete test in accordance with this invention can be made from one terminal only. The east terminal may be considered to be at some arbitrary remote geographical point.

The application of the testing system according to the present invention is not restricted to the particular type of repeater station shown in Fig. 1, and is equally applicable to a common amplifier type of repeater, such as that shown, for example, in Figs. 9 and 10 of United States Patent No. 2,020,297 issued to Oliver E. Buckley and O. B. Jacobs on November 12, 1935.

For purposes of simplification, power supply, pilot supply, carrier supply, and order circuits are not shown in Fig. 1, but will be understood to be included where required. As these are all conventional in nature and unnecessary to the operation of this invention, they have been omitted.

In accordance with the present invention, fault location networks 20 and 20' are bridged across the west-east side of repeater stations R1 and RN, respectively, and described in more detail below. At the west terminal test oscillators 14 and 15 supply waves of preselected test frequencies in the high transmission band to the transmitter. Oscillator 15 may be fixed, through not necessarily, in frequency at some designated frequency F1 in the high band such, for example, as 424 kilocycles per second. In the practical signal transmission system employing the principles of this invention, the 424 kilocycle test frequency is derived from the carrier source which is integral with the transmitter. Oscillator 14, on the other hand, may comprise a conventional decade type having an output frequency F2 in a range of test signal frequencies marginal to the high band of transmitted signal frequencies, i. e., test signal frequencies F1 and F2 lying in and adjacent to an end of the last-mentioned high band, and to be further mentioned hereinafter. By using the margin of the normal high transmission band, repeaters can be monitored without disabling or disrupting normal operation of the transmission system. However, it is readily apparent that it is not indispensable to the practice of this invention that the margins of the transmitted bands be used, but that one communication channel in each band may be set aside for fault location purposes.

There is also provided at the west terminal a frequency detector 17 connected to the receiver for selecting and identifying a returned difference test signal F3 from the particular unattended repeater station being tested at a given time, and comprising a sensitive frequency detector of a suitable type such, for example, as a resonant wave meter. In order for the detector to discriminate between message signals and the returned test signals, frequency detector 17 may include a suitable band-pass filter, not shown, for the range of frequencies occupied by the return test signals, in this instance 8.5 to 11.0 kilocycles per second. In addition to identifying the particular unattended repeater station under test, the detected test signal F3 may serve to provide such additional information regarding signal transmission thereat as may be required.

Figure 2:
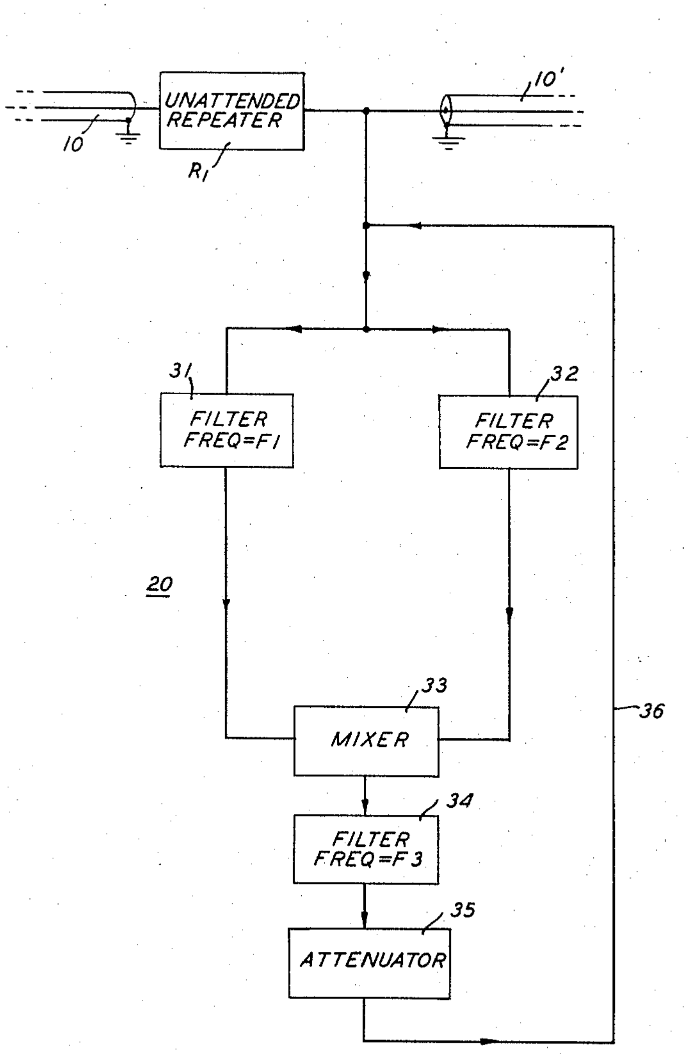
Fig. 2 shows in block diagrammatic form a specific embodiment of the invention incorporated in an unattended repeater station.

The block diagram of the fault location network 20 or 20' incorporated in each repeater station is shown in Fig. 2. Briefly, the two test signals F1 and F2 appearing at the east end of repeater R1, for example, are applied to a pair of highly selective filters 31 and 32 in parallel. Filter 31 is preferably a narrow band-pass type with a center frequency at 424 kilocycles per second for one test signal frequency of the particular embodiment of the invention being described. The test frequency F1 is used at all repeater stations for convenience and economy, but of course is not necessary to the practice of this invention. The second filter 32 in parallel with filter 31 is similar to filter 31 but is made to pass a test signal F2 of a frequency unique and preassigned to each unattended repeater station for identification purposes. The frequency identifying each unattended repeater station may be chosen advantageously from a band of frequencies marginal to the normal signal transmission band as abovementioned so that fault location testing may be carried out without interruption to the operation of the west-east branch of the transmission system for normal signaling purposes. The test frequency F2 is also so chosen as to be related to the test frequency F1 by a predetermined difference frequency F3 which is further mentioned below and which is marginal to the low band of normal signaling frequencies used for east-to-west transmission. The use of test frequency F3 enables fault location testing to be carried out without interruption to the operation of the east-west branch of the transmission system for normal signaling purposes.

Since the filters 31 and 32 are required to pass only the single test frequencies, F1 and F2, respectively, the effective bandwidth of the filters becomes a function of the frequency stability of the test frequency. The frequencies of the test signals will probably vary over a ±10 cycle-per-second range, for example, and therefore a compromise between discrimination requirements and passband objectives of the respective filters is necessary. Accordingly, each of the filters 31 and 32 may comprise, for example, a crystal filter of a hybrid coil type employing two crystals as described in "Electromechanical Transducers and Wave Filters," by W. P. Mason (D. Van Nostrand Co. Inc., New York, 1942) at page 262. Such a crystal filter appears to answer the above-noted requirements and objectives and, in addition, to be relatively economical to construct and maintain.

The outputs F1 and F2 of respective filters 31 and 32 are combined in a mixer 33, which may consist of one or more asymmetrically conducting elements such for example as copper oxide varistors, or the like, to produce among other modulation products the difference frequency F3, i. e., F3=F2−F1. A third narrow-band filter 34 connected to the output of mixer 33 is designed to pass back to the bridging point by way of path 36 at the repeater station only the frequency F3. As shown in Fig. 1, the test frequency F3 can be transmitted only in a east-west direction and thereby back to the west terminal for detection and identification as hereinbefore mentioned. An attenuator 35 may be required to present the proper signal level to the low-band amplifiers in the repeater station. A capacitor, not shown, may be necessary at the bridging point on cable section 10' if the cable carries direct-current power.

In a practical type of signaling transmission system to which the fault location principle of the present invention is being applied, the following frequency assignments in kilocycles as examples may be made.

| Test Frequency F1 | Test Frequency F2 | Return Signal F3 | Identified Unattended Repeater |
|---|---|---|---|
| 424.00 | 432.50 | 8.50 | A |
| 424.00 | 432.75 | 8.75 | B |
| 424.00 | 433.00 | 9.00 | C |
| 424.00 | 433.25 | 9.25 | D |
| 424.00 | 433.50 | 9.50 | E |
| 424.00 | 433.75 | 9.75 | F |
| 424.00 | 434.00 | 10.00 | G |
| 424.00 | 434.25 | 10.25 | H |
| 424.00 | 434.50 | 10.50 | I |
| 424.00 | 434.75 | 10.75 | J |
| 424.00 | 435.00 | 11.00 | K |

It may be noted that the scheme of frequency assignments adopted makes provision for the testing of up to eleven unattended repeater stations from a single terminal station. In the particular transmission system of the illustrative embodiment, a repeater station spacing of about twenty-five miles has been adopted. Thus, it is possible to monitor up to the order of 300 miles of transmission line extending in one geographical direction from a single terminal station. Obviously, the same terminal station could be utilized to monitor a similar number of unattended repeater stations and a like mileage of tranmission line extending in a different geographical direction. With increased repeater-station spacings and more highly-refined filters included in the fault location networks, transmission lines of greater distance may be expeditiously monitored. It has been found that, although the nominal cut-off frequencies of the transmission bands are at 432 kilocycles per second for high-band signal transmission and 12 kilocycles per second for low-band signal transmission, the transmission of test signals on the margins of these bands is practical for the above-noted testing purposes. The advantages of using the margins of the normal transmission bands to minimize interference with the normal message traffic during routine testing have been previously pointed out.

The method of operation is simply to inject the proper pair of test frequencies F1 and F2 for the particular unattended repeater station to be monitored at the west terminal of the line. These two test frequencies entering the particular unattended repeater pass through the high-band amplifiers where they are restored to their original level. The fault locating network then selects the two test frequencies from the transmission line at the east end thereof, detects the difference between them, and returns the difference frequency F3 to the line at a level consistent with that of the incoming east-west low-band signals at that unattended repeater. This difference frequency test signal F3 is then amplified by the east-west low-band amplifier in the repeater and transmitted back over the line to the west terminal. At the latter terminal, the detector connected across the line at the receiver selects and indicates the level of the returned test signal F3. The numerical frequency value of the returned test signal F3 therefore identifies the particular repeater location, and the absence of a particular test signal F3 or a predetermined level thereof indicates trouble in a given repeater, or in the cable section connecting thereto. If the fault is determined to be in a particular cable section, a further sheck of that cable section may be made from the adjacent repeater station by other conventional methods such, for example, as direct-current loop methods or pulse-echo techniques. In addition, the detected test signal F3 may provide such additional information at particular unattended repeater stations as may be desired.

Although the invention has been described and illustrated above for use with a two-way submarine cable system, it is to be understood that it may be expeditiously used equally as well with open-wire and buried-cable carrier systems of the two-way or physical four-wire type. In the case of the physical four-wire type in which identical signal frequency bands are employed for opposite directions of signal transmission, the test signals may be in or adjacent to the high end of the normal signal transmission band while the difference frequency of the return test signal may be chosen to be in or adjacent to the low end of the normal signal transmission band.

It is therefore to be further understood that the above described embodiment is illustrative of the principles of the invention and that numerous other arrangements may be devised by those skilled in the art, without departing from the spirit and scope of the invention.

What is claimed is:

1. In a signaling system comprising an attended station and a plurality of unattended repeater stations geographically separated from said attended station and from each other, a transmission line connecting said attended station and unattended stations for the transmission of intelligence to preselected unattended stations and from the last-mentioned stations back to said attended station via two different frequency bands, means at said attended station for applying to said transmission line a plurality of pairs of test waves of preassigned discrete frequencies lying in a first of said transmission bands and having a difference frequency lying in a second of said transmission bands, frequency selective means at each unattended station for mixing one of said preassigned pairs of said test waves to produce a wave of a difference frequency distinctive of one of said unattended stations, means at each of said unattended stations for returning said difference frequency wave over said transmission line to said attended station, and means at said attended station for detecting the numerical values of the frequency of said returned difference frequency waves and measuring the amplitude thereof for identifying the unattended stations and indicating the transmission conditions thereat respectively.

2. In a two-way signaling transmission system including means for transmitting signaling waves in two different frequency bands for opposite directions of transmission in said system, a first station and a plurality of spaced repeater stations, means at said first station for transmitting a pair of test waves of different frequencies lying in one of said frequency bands for one direction of transmission in said system, one of said test waves being distinctive of one of said repeater stations, said pair of test waves having a difference frequency lying in a second of said frequency bands for the opposite direction of transmission in said system, mixing means at each of said repeater stations selective of a preassigned pair of said test waves including one of said distinctive frequency waves, said mixing means producing a difference frequency wave distinctive of one of said repeater stations, means at each repeater station for returning said difference frequency wave to said first station, and means at said first station for monitoring said returned difference frequency waves to identify each of said repeater stations and simultaneously therewith to indicate the transmission condition thereat.

3. In a two-way transmission system employing a high band of frequencies for transmission of intelligence in one direction and a low band of frequencies for transmission in the opposite direction and comprising an attended station and a plurality of unattended stations spaced at intervals along said transmission system, each of said unattended stations including a pair of directional amplifiers for selective two-way transmission therethrough in opposite directions, means at said attended station for generating a plurality of pairs of test tones of different frequencies lying in said high band of frequencies, one of which test tones is distinctive of one of said unattended stations, each of said pairs of test tones having a difference frequency distinctive of said last-mentioned one repeater station and lying in said low band of frequencies, means for impressing selected pairs of said test tones on said transmission system having mean at each of said unattended stations for selecting and mixing one preassigned pair only of said test tones impressed on said system to derive a distinctive identifying frequency difference tone therefrom, means at each said unattended station for impressing said identifying tone on said system for transmission back to said attended station, and means at said attended station for detecting and measuring said identifying tones for identifying each unattended station and the transmission condition thereat.

4. In a two-way signaling transmission system including means for transmitting signaling waves in opposite directions in different first and second operating frequency bands, a first station and a plurality of geographically spaced repeater stations, means at said first station for transmitting a plurality of pairs of test waves of different frequencies, at least one test wave of each pair of said plurality of pairs of test waves having a frequency selectable from a plurality of frequencies included in said first operaging frequency band, each pair of said plurality of pairs of test waves having a predetermined difference frequency included in said second operating frequency band, said one test wave of each pair of said plurality of pairs of test waves being so preassigned that the predetermined frequency difference between said last-mentioned pair of test waves identifies one repeater station, means at each of said repeater stations to select a preassigned pair of said test waves for producing a third test wave having a frequency equal to one identifying predetermined frequency difference, means at each repeater station for returning said third test wave to said first station, and means at said first station for utilizing said returned third test waves to identify said respective repeater stations, said last-mentioned means also utilizing said last-mentioned test waves to indicate the condition of signaling transmission at the respective identified repeater stations.

5. The signaling system according to claim 4 in which said selecting means at each repeater station includes a pair of crystal filters, each having a characteristic to transmit one test wave of each pair of test waves preassigned to said last-mentioned repeater station.

6. The signaling system according to claim 5 in which said selecting means at each repeater station also includes a mixer connected to the outputs of said pair of crystal filters for translating the selected pair of test waves into said third test wave.

7. The signaling system according to claim 4 in which said returning means at each repeater station includes a crystal filter connected to the output of said mixer for selecting said third test wave therefrom and returning said last-mentioned wave to said utilizing means at said first station.

8. The signaling system according to claim 4 in which said utilizing means comprises a frequency detector for determining the numerical values of the returned third test waves and thereby identifying the respective repeater stations, and said utilizing means also comprises another detector for determining the amplitudes of the returned third test waves and thereby indicating the condition of signaling transmission at the respective identified repeater stations.

References Cited in the file of this patent

UNITED STATES PATENTS

| | | |
|---|---|---|
| 1,611,350 | Jammer | Dec. 21, 1926 |
| 2,249,323 | Mitchell | July 15, 1941 |

FOREIGN PATENTS

| | | |
|---|---|---|
| 103,670 | Australia | Apr. 5, 1938 |